March 6, 1934.   C. F. BIERBACH   1,950,218
WINDOW SHUTTER
Original Filed Oct. 31, 1929
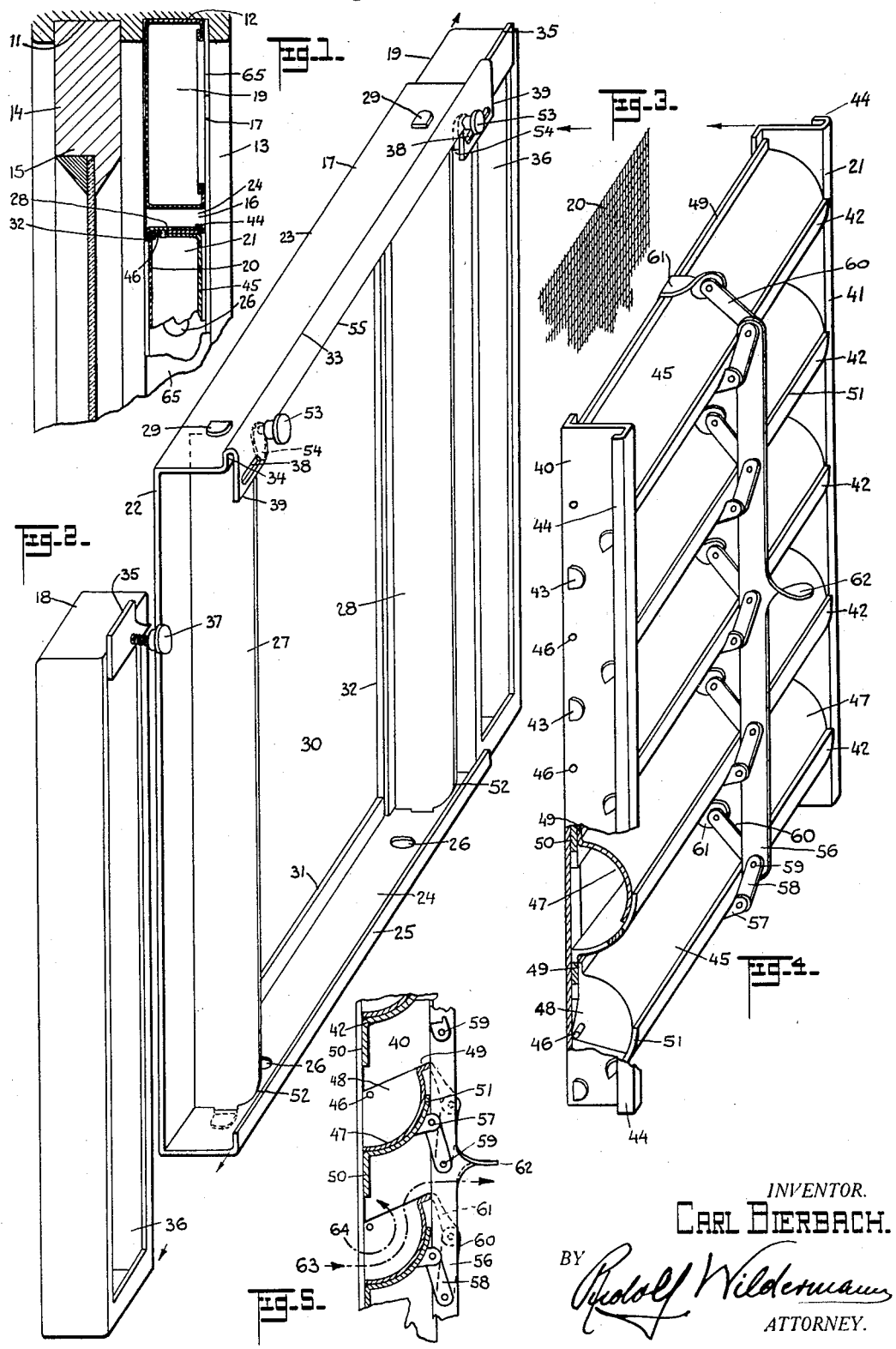
INVENTOR.
CARL BIERBACH.
BY
ATTORNEY.

Patented Mar. 6, 1934

1,950,218

UNITED STATES PATENT OFFICE 1,950,218

WINDOW SHUTTER

Carl F. Bierbach, Brooklyn, N. Y., assignor, by mesne assignments, to Rudolf Wildermann, New York, N. Y.

Application October 31, 1929, Serial No. 403,714
Renewed July 24, 1933

10 Claims. (Cl. 189—62)

This invention refers to window shutters which are interposed between the inside and the outside of a building for the purpose of ventilation. In particular it refers to a window shutter which is adapted to be permanently or removably inserted in a window frame, and which, in a preferred form, partly or wholly replaces a sash.

Among the objects of my invention is the adaptation of a window shutter to window frames in such a manner that it is firmly seated therein and that it closes substantially air tight towards the frame and towards the adjoining sash or sashes.

Another object of my invention is to provide a window shutter which may be used in connection with window frames and sashes of various size and modified in construction.

A further object of my invention is to provide a window shutter which permits a regulation of the ventilation, one limit of said regulation being the complete interception of air currents through my shutter.

Another object of my invention is to provide a window shutter by means of which air currents are diverted in such a manner that they do not cause a direct draft close to or further away from the window in which this shutter is mounted; but a normal circulation of the air is enhanced thereby.

Another object of my invention is to provide in a window shutter means for whirling the air passing through that shutter in such a manner that dirt, dust, and impurities are separated therefrom and that they are precipitated on the outside of said shutter.

Another object of my invention is to provide a shutter which serves the purpose of a blind as well as prevents the entry of rain, hail or snow, even when fully open.

A further object of my invention is to provide a shutter in which protection against mosquitoes and other insects may readily be included, by the insertion of a removable piece of wire screen or screen cloth.

Another object of my improvements is to provide in connection with my window shutter an adaptable shutter frame, from which the shutter part may readily be removed.

In view of these and other objects I have developed an improved window shutter which is described in the following specification and claims and which is exemplarily illustrated in the accompanying drawing, in which, Figure 1 shows part of a horizontally cross sectioned window frame, into which my improved window shutter has been inserted, below the inner sliding sash. The plane of cross section passes through the window shutter which is mounted in the runways of the inner sash, and through the lowered outer sash of a window.

Figure 2 shows the frame of my window shutter in a partly exploded parallel perspective view.

Figure 3 shows the corner of a piece of wire screen, in parallel perspective.

Figure 4 shows the shutter proper or shutter insert in a similar parallel perspective view, in a closed position.

The screen of Figure 3 and the shutter proper of Figure 4 are arranged in the drawing in such relation to the frame of Figure 2 that these figures represent my improvements in an exploded view, the adaptors being partly and fully exploded from the frame towards the right and left side, respectively, in Figure 2, whereas the screen and the shutter proper of Figures 3 and 4 are shown exploded from the frame of Figure 2 at right angles thereto, towards the inside of a room.

Figure 5 shows a sectional sectioned side view of the shutter insert, the shutter being in an open position.

Similar numerals refer to similar parts throughout the various views.

In Figure 1 I show the sectional outer and inner stile runway 11 and 12, the staff head 13 and the stile 14 of a sash 15, as the well known parts of a sliding window. Into the runway 12 of the inner sash my improved shutter 16 is inserted.

My window shutter comprises a substantially square frame 17, two adaptors 18 and 19, slidable in the sides thereof and having substantially the shape of rectangular parallelepipeds, a piece of wire screen 20 and the substantially rectangular shutter proper, or shutter insert 21.

The frame 17 is shaped from sheet material to represent a vertical face 22 from which inwardly extend the substantially parallel upper and lower sides 23 and 24. From the lower side 24 an edge 25 extends upwardly, for a short distance, said edge 25 resting against the side of the staff head 13 of the window, the side 24 extending along the lower rail runway 65 of the window frame and being provided with openings 26 which allow the draining of water. The upper and lower sides 23 and 24 of the frame are connected by angle pieces 27 and 28, the ends of said angle pieces being secured in the upper and lower sides 23 and 24 by means of tongues 29 extending through and secured in suitable openings in said sides. The angle pieces 27 and 28 and the sides 23 and 24 of the frame surround an opening 30 in the face 22. The hole 30 is slightly smaller than the rectangular space confined by the rectangular pieces 27 and 28 and the sides 24 and 23, so that the face 22 of the frame extends into said opening 30 with upper and lower rims 31 and with rims 32 on the sides. The material making up the rims on the sides is bent over and secured to the angle part of the angle pieces 27 and 28. The upper side 23 of the frame has a trough shaped, upward extension 33, on its inside, which rests as a strip against the inner sash, in the manner of the staff head 13 on the inside of the room, when the inner sash of the window rests upon the top of the upper side 23. Into the channel 34 of the trough shaped extension 33 fit the extensions 35, which upwardly protrude from the inside of the adaptors 18. These adaptors represent boxes with rimmed openings 36, through which the hand of the operator may be inserted therein, to slide these adaptors into position, inside of a window frame. The extension 35 partly extends downward, over the opening 36 of the adaptor, and a flanged screw 37 is removably inserted in this part of the extension. Slots 38 are provided in lips 39, which extend downward from extension 55, below the horizontal plane of the upper side 23 of the frame. The screws 37 fit into these slots 38 and may be clamped upon the lips 39, thus locking the adaptors 18 and 19 in fixed positions in relation to the frame 17. They are retained in the frame frontwardly, by the face of the frame 22, backwardly (towards the inside of the room) by the lips 39 and by the edge 25 of the lower side 24 of the frame, and the adaptors are pushed outwardly, sliding along the confining sides enumerated above, until they firmly engage the window frame, in the stile runways 12. When the adaptors are firmly lodged in these stile runways, the screws 37 fixedly retain there adaptors in position so that the shutter frame 17 is firmly located in the window frame, being seated by means of the adaptors in the stile runways 12, by means of its lower side 24 and the edge 25 thereof in the bottom rail runway 65 of the window frame in abutment upon the staff head 13, and the bottom of the lower rail of the inner sash facing the upper side 23 and the adjoining face of the trough shaped extension 33.

The shutter insert 21 consists of two sides 40 and 41, which are held parallel to each other, at a suitable distance, by the five concave cross pieces 42, which are fastened in said sides of the shutter insert by tongues 43 extending therethrough, in the same manner in which the angle pieces 27 are fastened upon the upper and lower sides of the frame. The ends of the sides 40 and 41 of the shutter insert are looped back upon themselves, outwardly, said loops 44 sliding over the edges of the angle pieces 27, when the shutter insert is inserted in the space of the shutter frame 17, which is confined by the upper and lower sides 23 and 24 and the angle pieces 27 and 28 and which is outwardly confined by the rims 31 and 32 surrounding the opening 30 in the face 22 of the shutter frame. When thus inserted in the shutter frame, the shutter insert presses the screen 20 into the frame, against the rims 31 and 32. But the screen may be left out of the assembly, if so preferred.

The concave cross pieces 42 accommodate, in their concave part, the shutter barrels 45, which are concentrically rotatably mounted between the sides 40 and 41 by means of studs 46 extending into suitable holes in said sides. In the lower left hand corner of Figure 3 a part of side 40 of the shutter insert is sectioned away, showing the full end of the lowest shutter barrel intact, whereas the shutter barrel above has its end sectioned away. The shutter barrels 45 consist of cylindrical segments 47, flanged at their ends by sectors 48 in which the studs 46 are mounted. From one edge of the cylindrical segment 47 radially extends the edge 49; this edge abuts, in the closed position of Figure 4, upon the flange 50 which extends vertically downward from the concave cross piece 42. In the open position of Figure 4 the upper ends 51 of the concave cross pieces 42 overlap the shutter barrels 45, for a short distance, and are tensionally and frictionally engaged upon the surface of said barrels; that friction serves to retain the barrels in any position of opening to which the shutter may be adjusted; it is brought about by tensional properties of the material, out of which the cylindrical segment is made. The upper edge of the cylindrical segment 42 being tensioned upon the outside of the barrel 45 in the closed position of Figure 4, a substantially air tight connection is provided between said parts in the closed position of the shutter.

The shutter insert is retained in its position in the shutter frame, at the lower end of said frame, by the edge 25 extending upward from the lower side 24 of the shutter frame. To allow an insertion of the lower end of the shutter insert into the space confined by the rim 31, the side 24 and the edge 25 of the shutter frame, the lower ends 52 of the angle pieces 27 are rounded off, as shown in Figure 2. The upper end of the shutter insert is locked in position in the shutter frame 17 by a turning of the eccentric latches 53, eccentric tongues 54 on which are slidable in the channel 34 and extend from said channel over the shutter insert, when rotated. The outer edge 55 of the trough shaped extension 33 of the upper side 23 of the shutter frame does of course not extend downward in the manner of the lips 39, but it ends flush with the bottom of the upper side 23 of the frame, thus clearing the space into which fits the shutter insert.

Whereas the hollow part of the concave cross pieces 42 represents substantially a quarter circle, the surface of the barrel 45 represents a greater segment of a circle, so that it extends at an angle, upwardly, when the shutter insert is in the open position of Figure 5, the radially disposed edge 49 of the barrel 45 and the edge 50 extending downward from the concave cross piece being substantially in horizontal alignment, when the shutter is open.

The opening and closing of the shutter is brought about by operation of the vertical connector 56. Connector 56 is swingably hinged by means of the links 58 upon the lugs 57 extending from the backs of the concave cross pieces 42 so that the connector 56 may be swung from the position of Figure 4 to the position of Figure 5, said connector remaining substantially parallel to itself during this movement. The links 58 are connected to the connector 56 by pivots 59. These pivots 59 connect to tongues 61 which backwardly extend from the radially disposed edges 49 of the barrels, by means of links 60. When therefore the operator of my shutter moves the connector 56 up and down, grasping it by means of the lug 62 extending therefrom, the movement of the connector is transmitted to the shutter barrels by means of the link 60 and tongue 61 and all the barrels 45 are simultaneously and coextensively shifted back and forth between the closed position of Figure 4 and the open position of Figure 5.

When the shutter is in the open position of Figure 5 the air may proceed from the outside of the window to the inside thereof, substantially along the dot-dashed line 63. Thus a whirling motion, along circle 64 is imparted to the air entering upon the shutter; this whirling motion, intercepted by flange 50 extending downward from the concave cross piece 42, breaks the force of the air current, thus preventing draft on the inside of the room which is closed by the shutter, the whirling motion of the air causing at the same time the dust or other foreign matter which may be carried along by and suspended in the air, to be precipitated out of said air and to drop into the inside of the barrel and to slide from there to the outside of the window. Rain, hail and snow are prevented from entering upon the inside of a room in like manner.

I thus provide a window shutter which permits thorough ventilation of a room, intercepting any undesirable matter which might be carried along by the air in passing through the shutter and which also breaks the force and diverts the air currents. For this purpose I use a plurality of concave partitions which vertically overlap and which, respectively, impart a whirling motion to the air which produces the above described effect. The openings between overlapping shutter members may be enlarged or completely closed, so as to control the amount of air passing therethrough, the whirling effect being retained in all positions.

Although I have shown and described one form of embodiment of my invention in detail, yet I do not wish to be limited thereby, except as the state of the art and the appended claims may require, for it is obvious that various modifications and changes may be made in the form of embodiment of my invention, without departing from the spirit and scope thereof.

I claim:

1. In a window shutter, a frame, and shutter members horizontally disposed in said frame and substantially parallel to each other, said shutter members having substantially cylindrical segments extending concavely inward and upward therefrom, when viewed from the outside.

2. In a window shutter, a frame, and shutter members horizontally disposed in said frame and substantially parallel to each other, said shutter members having substantially cylindrical segments extending concavely inward and upward therefrom, when viewed from the outside, said segments extending in a vertical direction to substantially the level of the lower edge of the upwardly adjoining shutter member when the shutter is opened.

3. In a window shutter, a frame, shutter members horizontally disposed in said frame and substantially parallel to each other, said shutter members having substantially cylindrical segments extending concavely inward and upward therefrom, when viewed from the outside, and means for adjustably and peripherally elongating said segments until they abut upon the upwardly adjoining shutter member.

4. In a window shutter, a frame, shutter members horizontally disposed in said frame and substantially parallel to each other, said shutter members having substantially cylindrical segments extending concavely inward and upward therefrom, when viewed from the outside, said segments extending in a vertical direction to substantially the level of the lower edge of the upwardly adjoining shutter member, when the shutter is opened and means for adjustably and peripherally elongating said segments until they abut upon the upwardly adjoining member.

5. In a window shutter, a frame, shutter members horizontally disposed in said frame in substantially vertical alignment, substantially cylindrical segments comprised in said shutter members and extending concavely inward and upward, when viewed from the outside, and rotatable segmental barrels concentrically disposed within said segments and peripherally movable in reference to said segments.

6. In a window shutter, a frame, shutter members horizontally disposed in said frame in substantially vertical alignment, substantially cylindrical segments comprised in said shutter members and extending concavely inward and upward, when viewed from the outside, rotatable segmental barrels concentrically disposed within said segments, and means operatively connected to said barrels and adapted to move said barrels concentrically and peripherally in reference to said segments.

7. In a window shutter, a frame, shutter members horizontally disposed in said frame in substantially vertical alignment, substantially cylindrical segments comprised in said shutter members and extending concavely inward and upward, when viewed from the outside, rotatable segmental barrels concentrically disposed within said segments, a substantially vertically disposed rod, hingedly connected with said shutter and swingable up and down, substantially parallel to itself, and links operatively connecting said barrels to said rod, so that by a movement of said rod the angular extent of the combined cylindrical surface of said segments and barrels may be increased or decreased.

8. In a window shutter, a plurality of parallel strips arranged in the plane of the outer face of said shutter, and overlapping concentric sheet sections forming semi-circular compartments, connecting between said strips and concavely extending from said face into said window shutter.

9. In a window shutter, a frame, shutter members horizontally disposed in said frame in substantially vertical alignment, substantially cylindrical segments fixedly extending across said frame, and segmental barrels extending over an obtuse angle and concentrically rotatably disposed upon said segments.

10. In a window shutter, a frame, shutter members horizontally disposed in said frame in substantially vertical alignment, substantially cylindrical segments comprised in said shutter members and extending concavely inward and upward, when viewed from the outside, rotatable segmental barrels concentrically disposed within said segments, and means extending from said barrels over the respective segments and operatively connecting said barrels.

CARL F. BIERBACH.